(12) United States Patent
Billman (10) Patent No.: US 8,239,773 B1
(45) Date of Patent: Aug. 7, 2012

(54) SYSTEMS AND METHODS FOR CO-BROWSING ON A MOBILE DEVICE

(75) Inventor: Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 531 days.

(21) Appl. No.: 12/259,563

(22) Filed: Oct. 28, 2008

(51) Int. Cl.
 *G06F 3/00* (2006.01)
(52) U.S. Cl. .................................. 715/751; 715/753
(58) Field of Classification Search .................. 715/751, 715/753, 759
See application file for complete search history.

(56) References Cited

U.S. PATENT DOCUMENTS

| | | | |
|---|---|---|---|
| 7,277,726 B2 * | 10/2007 | Ahya et al. ..................... | 455/557 |
| 7,287,054 B2 * | 10/2007 | Lee et al. ....................... | 709/204 |
| 7,401,294 B2 * | 7/2008 | Chang et al. ................... | 715/733 |
| 7,698,660 B2 * | 4/2010 | Sanchez et al. ............... | 715/863 |
| 7,729,366 B2 * | 6/2010 | Mok et al. ...................... | 370/401 |
| 8,010,901 B1 * | 8/2011 | Rogers .......................... | 715/751 |
| 2002/0080757 A1 | 6/2002 | Narvanen et al. | |
| 2003/0097448 A1 * | 5/2003 | Menezes et al. .............. | 709/227 |
| 2004/0133668 A1 * | 7/2004 | Nicholas, III ................. | 709/223 |
| 2005/0033843 A1 | 2/2005 | Shahi et al. | |
| 2005/0050462 A1 | 3/2005 | Whittle et al. | |
| 2005/0091316 A1 | 4/2005 | Ponce et al. | |
| 2005/0165719 A1 | 7/2005 | Greenspan et al. | |
| 2005/0246422 A1 * | 11/2005 | Laning .......................... | 709/205 |
| 2005/0259618 A1 | 11/2005 | Ahya et al. | |
| 2005/0267870 A1 | 12/2005 | Everett-Church et al. | |
| 2007/0022158 A1 | 1/2007 | Vasa et al. | |
| 2008/0040436 A1 | 2/2008 | Setlur et al. | |
| 2008/0184128 A1 | 7/2008 | Swenson et al. | |
| 2008/0263139 A1 | 10/2008 | Martin | |

OTHER PUBLICATIONS

J. Grundy et al., Experiences developing a thin-client, multi-device travel planning application Downloaded on Aug. 27, 2008; Downloaded from the internet at URL <http://www.cs.auckland.ac.nz/~john-g/papers/chinz2002.pdf>.

* cited by examiner

*Primary Examiner* — Omar Abdul-Ali
(74) *Attorney, Agent, or Firm* — Brooks, Cameron & Huebsch, PLLC (57) ABSTRACT

A system, method, and computer-usable medium are disclosed for the concurrent display of information between devices. A co-browsing module is implemented to provide concurrent display of information displayed within a Web browser on a mobile device. A co-browsing module implemented on a stationary system queries a co-browsing module implemented on the mobile device to collect information including the device's hardware configuration, the network communications protocol being used, and a session number. The collected information is then used by the co-browsing module on the stationary system to establish a co-browsing session with the co-browsing module on the mobile device. The co-browsing module on the mobile device then provides web display information to the co-browsing module on the CSR's system to control the concurrent display of Web information displayed on the mobile device.

20 Claims, 5 Drawing Sheets

SYSTEMS AND METHODS FOR CO-BROWSING ON A MOBILE DEVICE

CROSS REFERENCE TO RELATED APPLICATIONS

U.S. patent application Ser. No. 12/259,555, entitled "Systems and Methods for Co-Browsing on a Mobile Device," inventor Bradly Jay Billman, filed on Oct. 28, 2008, describes exemplary methods and systems and is incorporated by reference in its entirety.

U.S. patent application Ser. No. 12/259,595, entitled "Systems and Methods for Co-Browsing on a Mobile Device," inventor Bradly Jay Billman, filed on Oct. 28, 2008, describes exemplary methods and systems and is incorporated by reference in its entirety.

BACKGROUND

1. Field of the Disclosure

Embodiments of the disclosure relate in general to the field of computers and similar technologies, and in particular to software utilized in this field. Still more particularly, it provides a system, method, and computer-usable medium for the concurrent display of information between devices.

2. Description of the Related Art

The processing capabilities of many of today's mobile devices, coupled with ubiquitous wireless access to the Internet, have moved mobile access to information into the mainstream of everyday life. Many of these devices provide a rich user interface (UI) and a simplified Web browser, and it is now common to see consumers using hand-held devices to get a weather forecast, check the latest news, make a purchase, or even conduct financial transactions of all kinds. However, despite constant design improvements in mobile devices, their user interfaces, and the applications they support, there is an ongoing need for end-user support.

Due in part to these very same improvements, customer service representatives (CSRs) and technical support personnel may encounter new difficulties in providing assistance to mobile device users. In particular, there are situations where a CSR is not able to "co-browse" with a user and simultaneously comment on what the user is viewing on their mobile device. While co-browsing has become commonplace to support end users of personal computers, multiple challenges have prevented its implementation on mobile devices.

For example, the mobile device may be using a wireless data communication protocol, such as General Packet Radio Service (GPRS), Enhanced Data rates for Global Evolution (EDGE), or Third Generation (3G), which requires translation to the Internet Protocol (IP) used by the Internet. While these wireless protocols support such translation, they use a network addressing scheme that is different from IP addresses. As a result, support for address translation and mapping is required. Another challenge is simultaneously supporting the wide variety of proprietary Web browsers used by mobile devices, which include JB5 (Symbian), Safari, Nokia, Opera, and others. Furthermore, determining which of these browsers is implemented on a mobile device, and then replicating it within another Web browser such as Internet Explorer or Firefox on a CSR's system creates additional complexities. Yet another challenge is the fact that mobile devices are typically used while the user is in transit. As a result, a communication session is typically transitioned from one wireless access point to another during the course of the session. These transitions require the provision of a session identifier to maintain a co-browsing session. In addition, if the wireless connection is lost, there needs to be some way of identifying the mobile device user when they re-establish communication and regaining the state of the co-browsing session when it was interrupted.

BRIEF SUMMARY

A system, method, and computer-usable medium are disclosed for the concurrent display of information between devices. In various embodiments, a co-browsing module is implemented on a system operated by a customer service representative (CSR) to provide concurrent display of information displayed within a Web browser on a mobile device. In one embodiment, a mobile device user places a request for co-browsing support through a computer telephony integration (CTI) system. The request is then routed by the CTI system to a predetermined CSR's system. A co-browsing module implemented on the CSR's system then queries a co-browsing module implemented on the mobile device to collect information related to the mobile device. This information includes a unique identifier, the device's hardware configuration, the network communications protocol being used, and a session number. The collected information is then stored for later use to re-establish a co-browsing session if the connection with the mobile device is lost.

The collected information is then used by the co-browsing module on the CSR's system to establish a co-browsing session with the co-browsing module on the mobile device. In one embodiment, the CTI system provides a concurrent voice communication session between the CSR and the mobile device user. Once the co-browsing session is established, the co-browsing module on the mobile device provides web display information to the co-browsing module on the CSR's system to control the concurrent display of Web information displayed on the mobile device. In one embodiment, the web display information is used by the co-browsing module on the CSR's system to graphically reproduce the Web information within a Web browser as it is displayed within a browser implemented on the mobile device. The CSR then conducts a co-browsing session with the mobile device user. In one embodiment, the CSR establishes a connection through a virtual private network (VPN) to access customer information related to the mobile user.

In one embodiment, the mobile device is in transit and the mobile device's session identifier is used by the co-browsing module on the CSR's system to maintain the co-browsing session as the mobile device transitions from a wireless access point to another. In another embodiment, if the mobile device loses its connection, the co-browsing module on the mobile device provides the unique identifier of the mobile device to the co-browsing module on the CSR's system upon reconnection. The co-browsing module on the CSR's system then uses the unique identifier to recover information stored in memory to recover the state of the co-browsing session when the connection was lost.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

A method, system and computer-usable medium are disclosed for the concurrent display of information between devices. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
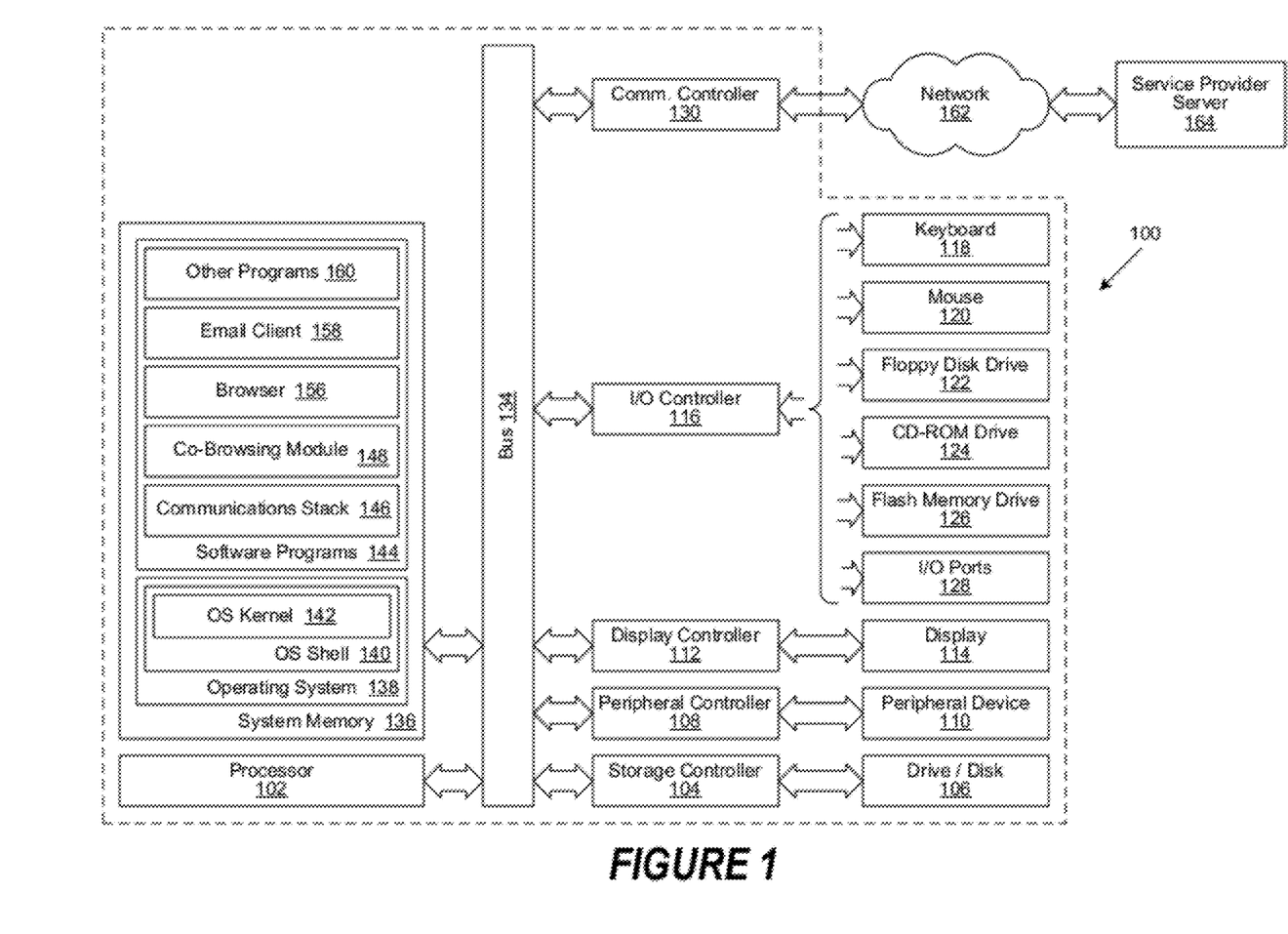
FIG. 1 depicts an exemplary client information processing system (IPS) in which embodiments of the disclosure may be implemented.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a co-browsing module 148. The co-browsing module 148 includes computer executable instructions for implementing the processes described in FIGS. 2-4 described hereinbelow. In one embodiment, client IPS 100 is able to download the computer executable instructions of the co-browsing module 148 from a service provider server 164 located at a remote location. In another embodiment, the computer executable instructions of the co-browsing module 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
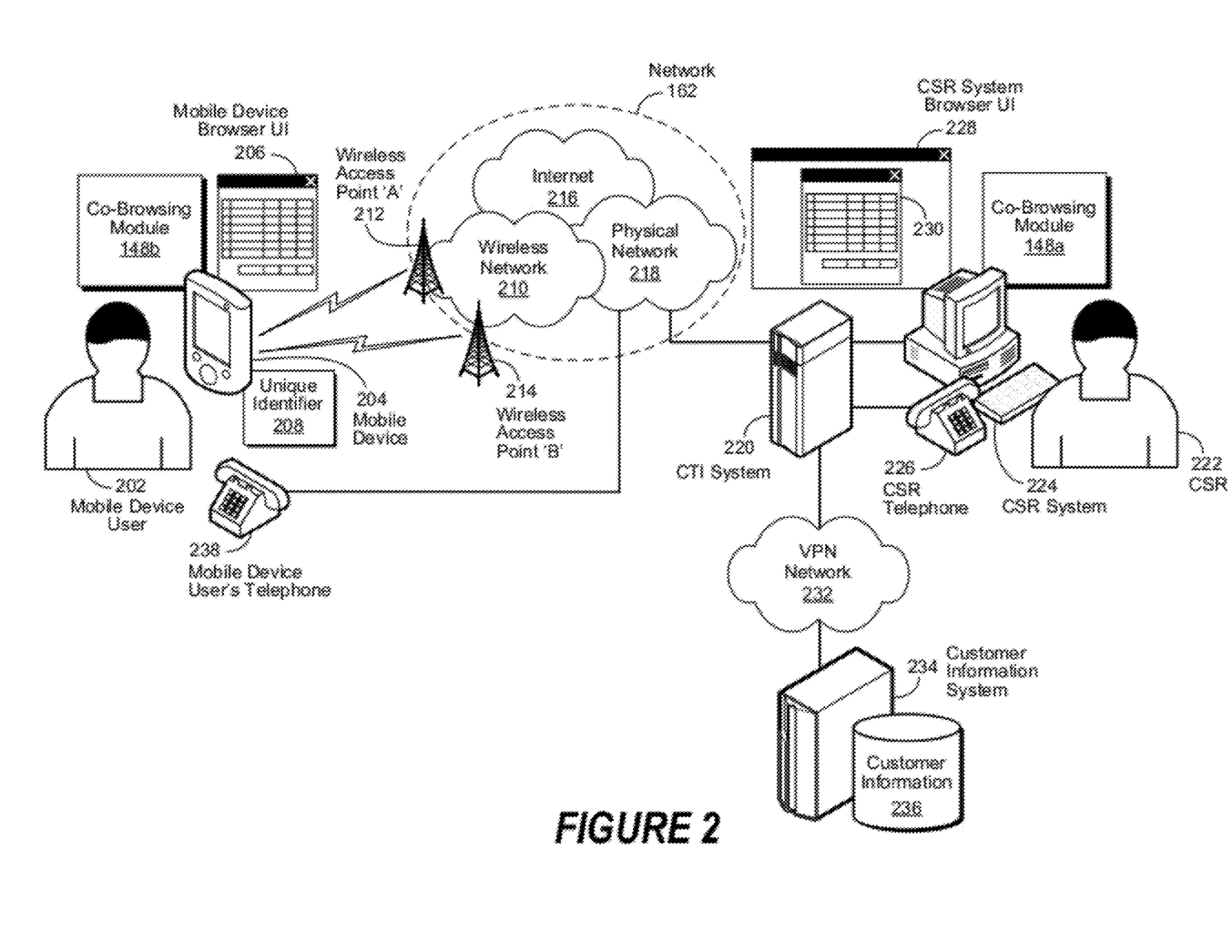
FIG. 2 is a simplified block diagram of a co-browsing module as implemented in accordance with an embodiment of the disclosure.

FIG. 2 is a simplified block diagram of a co-browsing module as implemented in accordance with an embodiment of the disclosure. In various embodiments, a co-browsing module 148a is implemented on a system 224 operated by a customer service representative (CSR) 222 to provide concurrent display of information displayed within a Web browser 206 on a mobile device 202 used by a mobile device user 202. In one embodiment, a mobile device user 202 places a request for co-browsing support through a link on a Web page displayed within the mobile device's browser 206. Selecting the link initiates the co-browsing request, which is wirelessly transmitted to a wireless access point 212, 214 of a wireless network 210, which is interconnected to the Internet 216 and a physical network 218. In one embodiment, network 162 comprises the wireless network 210, the Internet 216, and the physical network 218 as subnetworks. Skilled practitioners of the art will be educated in the topology of the Internet 216, its underlying communication protocols, and its interconnection with other networks, such as the physical network 218 and wireless network 210. Accordingly, the Internet 216 may be accessed over a connection to either the physical network 218 or wireless network 210. As an example, a mobile device may establish a wireless connection to wireless network 210. Once connected, the wireless device may access a Web site on the Internet 216, which is hosted by a server connected to the Internet 216 through the physical network 218. Those of skill in the art will likewise realize that the network 162 is heterogeneous. That is, it is comprised of many different physical components, many of which typically comprise a protocol processor for the translation of the various communication protocols used by other components to support interconnectivity and the exchange of information.

The request is then received by a computer telephony integration (CTI) system through a connection to physical network 218. As used herein, CTI refers to any combination of technologies and processes that enable or provide the integration and coordination of voice and data communications. The request is then routed by the CTI system 220 to the system 224 used by a predetermined customer service representative (CSR) 222. In one embodiment, the CSR's system is assigned an Internet Protocol (IP) address, which is used as an identifier to re-establish a co-browsing session in the event that the mobile device re-establishes its connection as a result of the occurrence of a termination event.

A co-browsing module 148a implemented on the CSR's system 224 queries a co-browsing module 148b implemented on the mobile device 204 to collect information related to the mobile device 204. This information includes, but is not limited to, a unique identifier 208 of the mobile device 204, the device's hardware configuration, the network communications protocol being used, and a session number. The collected information is then stored for later use to re-establish a co-browsing session if the connection with the mobile device 204 is lost. Once stored, the collected information is then used by the co-browsing module 148a on the CSR's system 224 to establish a co-browsing session with the co-browsing module 148b on the mobile device 204. In one embodiment, the CTI system 220 provides a concurrent voice communication session between the CSR 222 and the user 202 of the mobile device 204. In one embodiment, the concurrent voice communications session is provided by a voice over IP (VoIP) connection. In another embodiment, the concurrent voice communications session is provided by a wireless connection to the mobile device 204. In yet another embodiment, the concurrent voice communications session is provided by a connection to the physical network 218 between a telephone device 238 operated by the mobile user 202 and a telephone device 226 operated by the CSR 222. It will be appreciated that in some embodiments, the mobile device 204 may not be able to support concurrent voice and data operations, necessitating an out of band voice communications session using connections between the telephones 226, 238 and physical network 218.

Once the co-browsing session is established, the co-browsing module 148b on the mobile device 204 provides web display information to the co-browsing module 148a on the CSR's system 224 to control the concurrent display of Web information displayed on the mobile device. In one embodiment, the web display information is used by the co-browsing module 148a on the CSR's system 224 to graphically reproduce the Web information 230 within a Web browser 228 as it is displayed within a browser 206 implemented on the mobile device 208. The CSR 222 then conducts a co-browsing session with the mobile device user 202. In one embodiment, the CSR 222 establishes a connection through a virtual private network (VPN) 232 to access customer information system 234 to access customer information 236 related to the mobile user 202.

In one embodiment, the mobile device 204 is in transit and the mobile device's 204 session identifier is used by the co-browsing module 148a on the CSR's system 224 to maintain the co-browsing session as the mobile device transitions from wireless access point 'A' 212 to wireless access point 'A' 214. If the mobile device 204 loses its connection, the co-browsing module 148b on the mobile device 204 provides the unique identifier 208 of the mobile device 204 to the co-browsing module 148a on the CSR's system 224. In one embodiment, the unique identifier is an International Mobile Equipment Identity (IMEI) number. The co-browsing module 148a on the CSR's system 224 then uses the unique identifier 208 to recover information stored in memory to recover the state of the co-browsing session when the connection was lost.

Figure 3A:
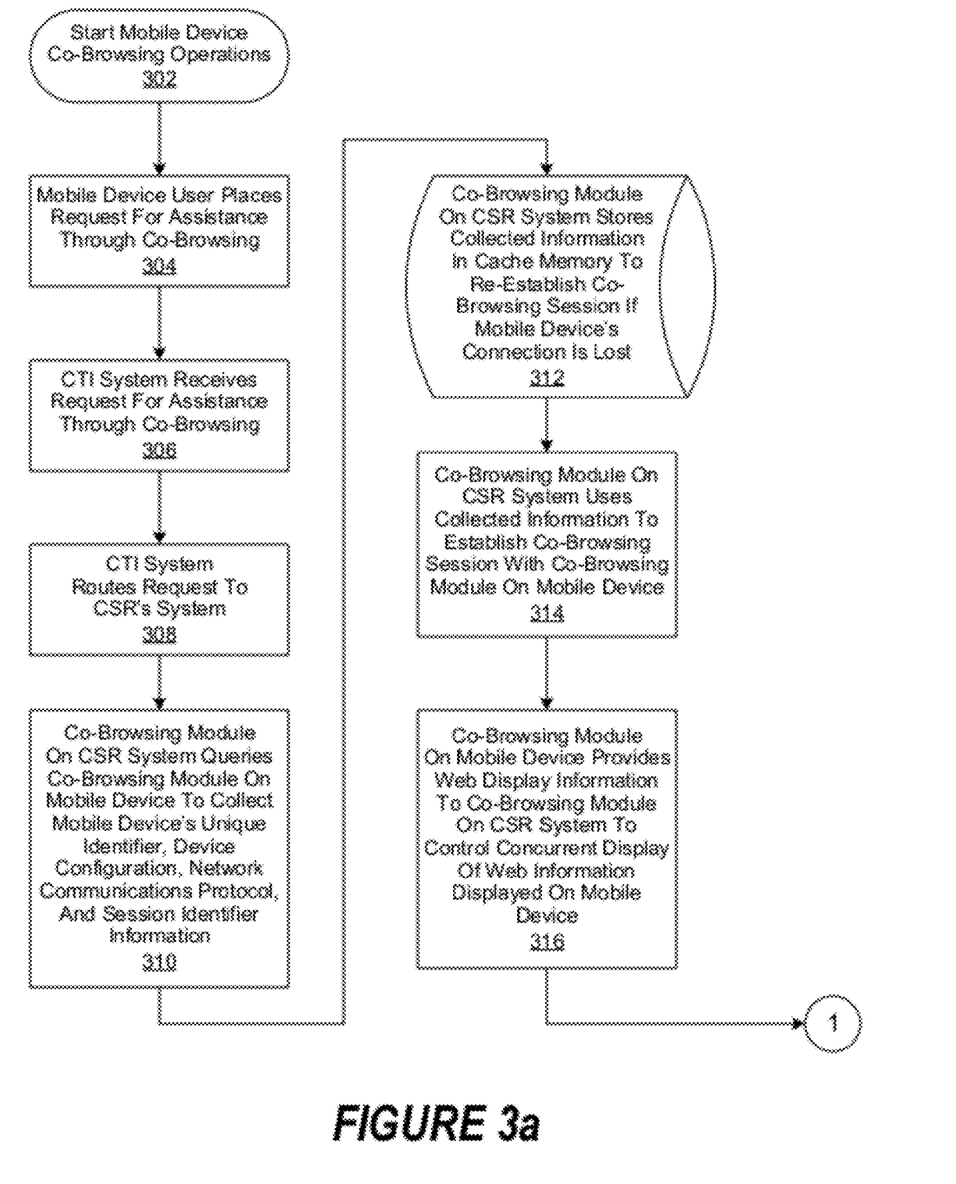
FIGS. 3a-b are a generalized flowchart of the operation of a co-browsing module as implemented in accordance with an embodiment of the disclosure.
Figure 3B:
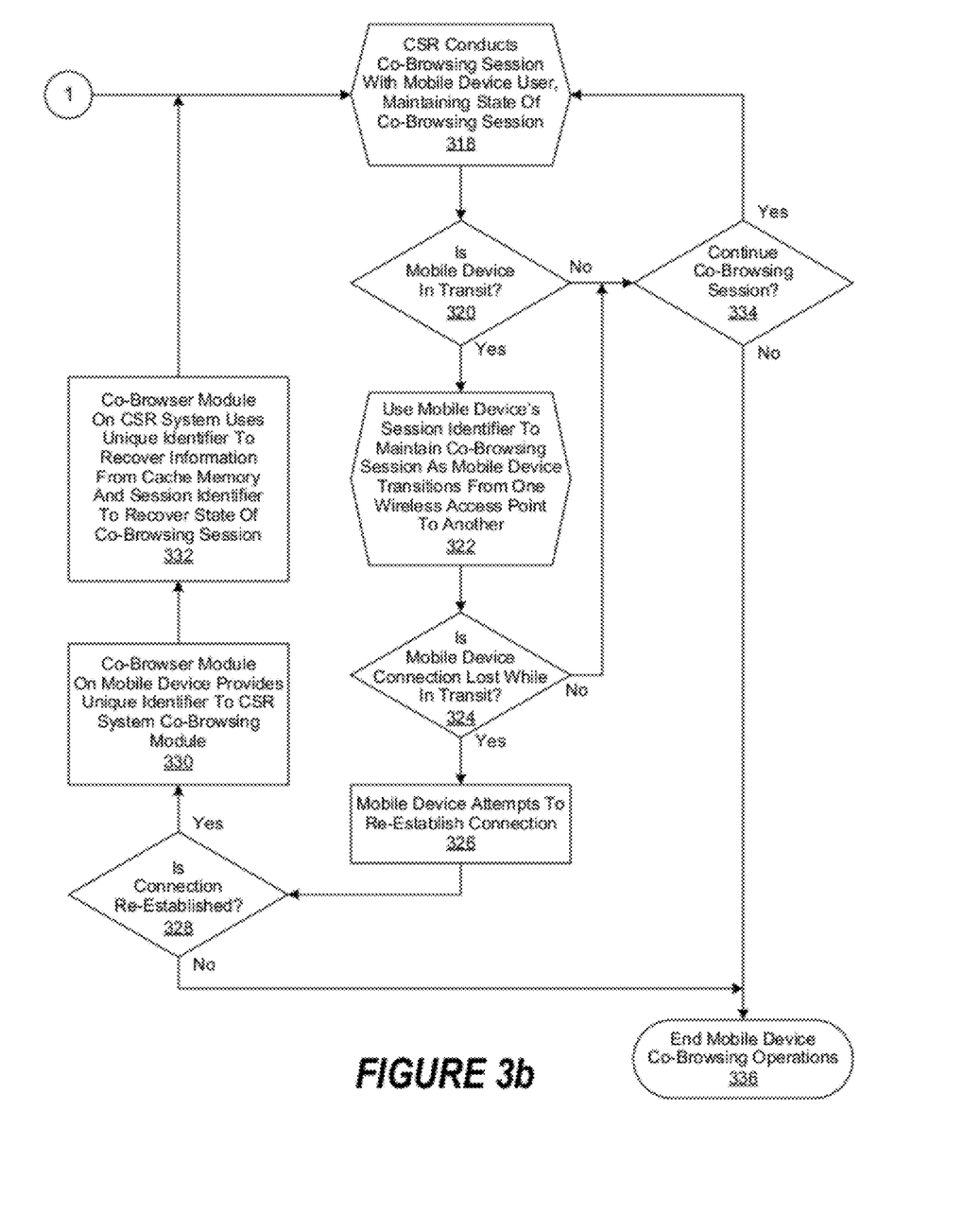

FIGS. 3a-b are a generalized flowchart of the operation of a co-browsing module as implemented in accordance with an embodiment of the disclosure. In this embodiment, mobile device co-browsing operations are begun in block 302, followed by a mobile device user placing a request for co-browsing support in block 304. In one embodiment, the request is placed through a link on a Web page displayed within the mobile device's browser. Selecting the link initiates the co-browsing request, which is received by a computer telephony integration (CTI) system in block 306. As used herein, CTI refers to any combination of technologies and processes that enable or provide the integration and coordination of voice and data communications. The request is then routed by the CTI system to the system used by a predetermined customer service representative (CSR) in block 308. In one embodiment, the CSR's system is assigned an Internet Protocol (IP) address, which is used as an identifier to re-establish a co-browsing session in the event that the mobile device re-establishes its connection as a result of the occurrence of a termination event.

In block 310, a co-browsing module implemented on the CSR's system queries a co-browsing module implemented on the mobile device to collect information related to the mobile device. This information includes, but is not limited to, a unique identifier of the mobile device, the device's hardware configuration, the network communications protocol being used, and a session number. In one embodiment, the unique identifier is an International Mobile Equipment Identity (IMEI) number. The collected information is then stored in memory in block 312 for later use to re-establish a co-browsing session if the mobile device's connection is lost. Once stored, the collected information is then used in block 314 by the co-browsing module on the CSR's system to establish a co-browsing session with the co-browsing module on the mobile device. In one embodiment, a CTI system provides a concurrent voice communication session between the CSR and the user of the mobile device. In one embodiment, the concurrent voice communications session is provided by a voice over IP (VoIP) connection. In another embodiment, the concurrent voice communications session is provided by a wireless connection to the mobile device. In yet another embodiment, the concurrent voice communications session is provided by a physical network connection, such as that provided by the Public Switched Telephone Network (PSTN), between separate telephone devices operated by the mobile user and the CSR. It will be apparent to those of skill in the art that many such connections are possible and the foregoing are provided as examples only and are not intended to limit the intent, spirit, or scope of the disclosure.

Once the co-browsing session is established, the co-browsing module on the mobile device provides web display information to the co-browsing module on the CSR's system in block 316 to control the concurrent display of Web information displayed on the mobile device. In one embodiment, the web display information is used by the co-browsing module on the CSR's system to graphically reproduce the Web information as it is displayed within a browser implemented on the mobile device. The graphically reproduced Web information is then displayed within a browser on the CSR's system. In another embodiment, a representation of the mobile device browser is rendered within a window of the CSR's browser by the co-browsing module implemented on the CSR's system. The CSR then conducts a co-browsing session with the mobile device user in block 318, while maintaining state information related to the co-browsing session in the event the mobile device loses its wireless connection or a termination event occurs.

A determination is then made in block 320 whether the mobile device is in transit. If not, then a determination is made in block 324 whether to continue the co-browsing session. If so, the process continues, proceeding with block 318. Otherwise, mobile device co-browsing operations are ended in block 336. However, if it is determined in block 320 that the mobile device is in transit, then the mobile device's session identifier is used in block 322 by the co-browsing module on the CSR's system to maintain the co-browsing session as the mobile device transitions from one wireless access point to another. A determination is then made in block 324 whether the mobile device has lost their connection while in transit. If not, then a determination is made in block 324 whether to continue the co-browsing session. If so, the process continues, proceeding with block 318. Otherwise, mobile device co-browsing operations are ended in block 336.

However, if it is determined in block 324 that the mobile device has lost its connection, then the mobile device attempts to re-establish the connection in block 326. A determination is then made in block 328 whether the connection was re-established. If not, then mobile device co-browsing operations are ended in block 336. Otherwise, upon connection as described in greater detail herein, the co-browsing module on the mobile device provides the unique identifier to the co-browsing module on the CSR's system in block 330. The co-browsing module on the CSR's system then uses the unique identifier in block 332 to recover information stored in memory to recover the state of the co-browsing session when the connection was lost. The process then continues, proceeding with block 318.

Figure 4:
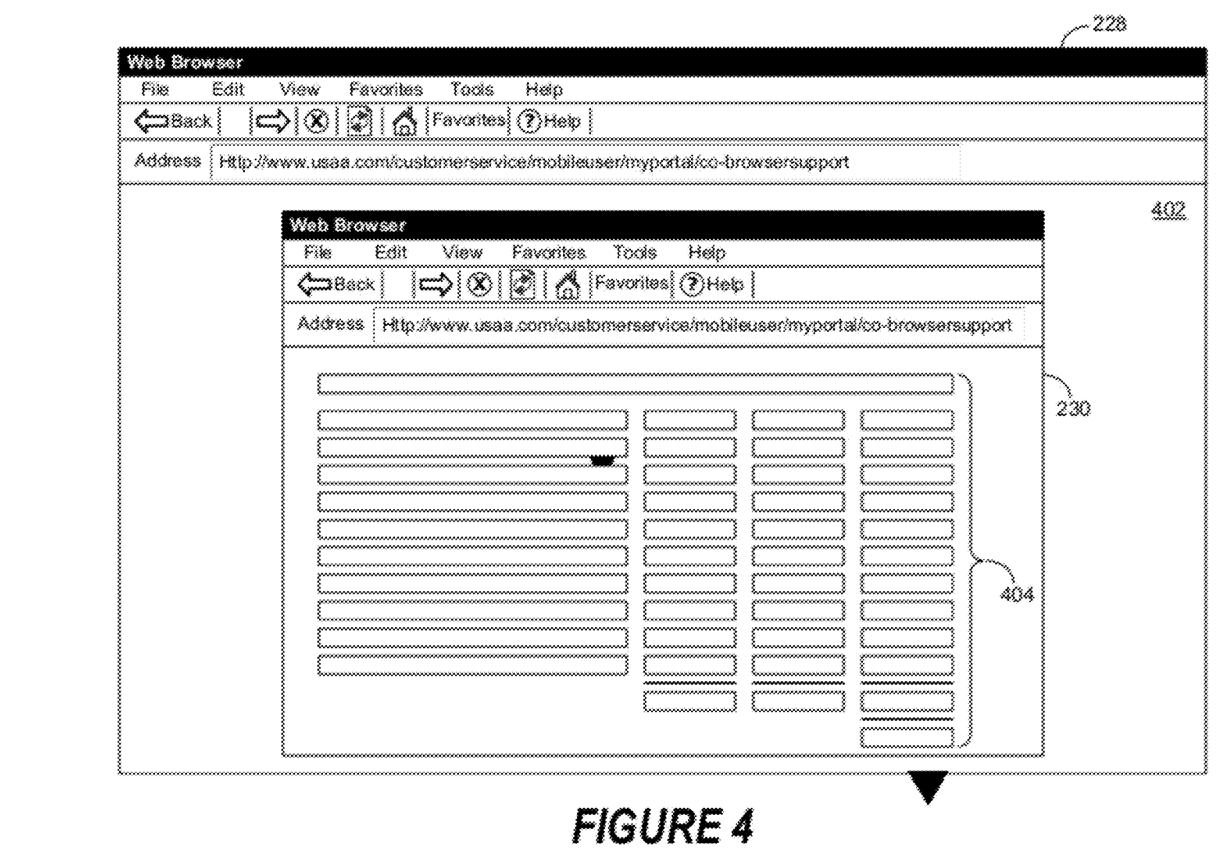
FIG. 4 is a simplified illustration of a co-browsing module as implemented within a user interface window in accordance with an embodiment of the disclosure.

FIG. 4 is a simplified illustration of a co-browsing module as implemented within a user interface window in accordance with an embodiment of the disclosure. In this embodiment, a Web browser 228 is implemented on the system of a customer service representative (CSR). Once a co-browsing session is established as described in greater detail herein, a graphical representation of the Web Browser user interface (UI) 230 of a Web browser implemented on a mobile device. During the co-browsing session, a co-browsing module implemented on the mobile device provides web display information to the co-browsing module on the CSR's system to control the concurrent display of Web information 404 displayed on the mobile device's browser.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A system for providing a concurrent display of information between devices, comprising:
    a first information processing device comprising a first co-browsing module and a first browser, said first co-browsing module being operable to receive web page display information over a network, comprising a plurality of subnetworks, from a second information processing device comprising a second co-browsing module and a second browser, said first co-browsing module being operable to use said web page display information to control the display of information in a first user interface in said first browser;
    wherein said information displayed in said first user interface is concurrently displayed in a second user interface in said second browser and said concurrent display of information is initiated upon receipt of a request from said second information processing device;
    wherein said first and second co-browsing modules are operable to maintain concurrent display of information in said first and second user interfaces while said second information processing device transitions from communication with a first wireless access point to communication with a second wireless access point; and wherein said first and second co-browsing modules are operable to re-establish concurrent display of information in said first and second user interfaces using configuration information of the said second information processing device after said second information processing device is decoupled from said network and subsequently recoupled to said network.

2. The system of claim 1, wherein said first information processing device is connected to a first said subnetwork comprising a first communication protocol and said second information processing device is connected to a second said subnetwork comprising a second communication protocol and a plurality of wireless network access points, wherein said network comprises a protocol processor operable to provide translation between said first communication protocol and said second communication protocol.

3. The system of claim 2, wherein said second subnetwork is operable to maintain said connection when said second information processing device passes out of the connectivity range of a first said wireless network access point and into the connectivity range of a second said wireless access point.

4. The system of claim 1, wherein:
said first co-browsing module is operable to receive said device configuration information from said second co-browsing module; and
said first co-browsing module is further operable to continue receiving said device configuration information when said second information processing device transitions from communication with a first wireless access point to communication with a second wireless access point.

5. The system of claim 4, wherein said device configuration information comprises a unique identifier.

6. The system of claim 5, wherein said unique identifier comprises an International Mobile Equipment Identity (IMEI) number.

7. A computer-implementable method for providing a concurrent display of information between devices, comprising:
using a first information processing device to receive web page display information over a network, comprising a plurality of subnetworks, from a second information processing device on said network, wherein said first information processing device comprises a first co-browsing module and a first browser and said second information processing device comprises a second co-browsing module and a second browser;
wherein said first co-browsing module is operable to use said web page display information to control the display of information in a first user interface in said first browser;
wherein said information displayed in said first user interface is concurrently displayed in a second user interface in said second browser and said concurrent display of information is initiated upon receipt of a request from said second information processing device;
wherein said first and second co-browsing modules are operable to maintain concurrent display of information in said first and second user interfaces while said second information processing device transitions from communication with a first wireless access point to communication with a second wireless access point; and
wherein said first and second co-browsing modules are operable to re-establish concurrent display of information in said first and second user interfaces using configuration information of the said second information processing device after said second information processing device is decoupled from said network and subsequently recoupled to said network.

8. The method of claim 7, wherein said first information processing device is connected to a first said subnetwork comprising a first communication protocol and said second information processing device is connected to a second said subnetwork comprising a second communication protocol and a plurality of wireless network access points, wherein said network comprises a protocol processor operable to provide translation between said first communication protocol and said second communication protocol.

9. The method of claim 8, wherein said second subnetwork is operable to maintain said connection when said second information processing device passes out of the connectivity range of a first said wireless network access point and into the connectivity range of a second said wireless access point.

10. The method of claim 7, wherein:
said first co-browsing module is operable to receive said device configuration information from said second co-browsing module; and
said first co-browsing module is further operable to continue receiving said device configuration information when said second information processing device transitions from communication with a first wireless access point to communication with a second wireless access point.

11. The method of claim 10, wherein said device configuration information comprises a unique identifier.

12. The method of claim 11, wherein said unique identifier comprises an International Mobile Equipment Identity (IMEI) number.

13. A non-transitory computer-usable medium embodying computer program code, the computer program code comprising computer executable instructions configured for:
using a first information processing device to receive web page display information over a network, comprising a plurality of subnetworks, from a second information processing device on said network, wherein said first information processing device comprises a first co-browsing module and a first browser and said second information processing device comprises a second co-browsing module and a second browser;
wherein said first co-browsing module is operable to use said web page display information to control the display of information in a first user interface in said first browser;
wherein said information displayed in said first user interface is concurrently displayed in a second user interface in said second browser and said concurrent display of information is initiated upon receipt of a request from said second information processing device;
wherein said first and second co-browsing modules are operable to maintain concurrent display of information in said first and second user interfaces while said second information processing device transitions from communication with a first wireless access point to communication with a second wireless access point; and
wherein said first and second co-browsing modules are operable to re-establish concurrent display of information in said first and second user interfaces using configuration information of the said second information processing device after said second information processing device is decoupled from said network and subsequently recoupled to said network.

14. The non-transitory computer usable medium of claim 13, wherein said first information processing device is connected to a first said subnetwork comprising a first communication protocol and said second information processing device is connected to a second said subnetwork comprising a second communication protocol and a plurality of wireless network access points, wherein said network comprises a protocol processor operable to provide translation between said first communication protocol and said second communication protocol.

15. The non-transitory computer usable medium of claim 14, wherein said second subnetwork is operable to maintain said connection when said second information processing device passes out of the connectivity range of a first said wireless network access point and into the connectivity range of a second said wireless access point.

16. The non-transitory computer usable medium of claim 15, wherein:
   said first co-browsing module is operable to receive said device configuration information from said second co-browsing module; and
   said first co-browsing module is further operable to continue receiving said device configuration information when said second information processing device transitions from communication with a first wireless access point to communication with a second wireless access point.

17. The non-transitory computer usable medium of claim 16, wherein said device configuration information comprises a unique identifier.

18. The non-transitory computer usable medium of claim 17, wherein said unique identifier comprises an International Mobile Equipment Identity (IMEI) number.

19. The non-transitory computer usable medium of claim 13, wherein the computer executable instructions are provided to a client computer from a server, wherein said server is located at a remote location.

20. The non-transitory computer usable medium of claim 13, wherein the computer executable instructions are provided as a service on an on-demand basis, wherein said service is provided by a service provider.

* * * * *